Figure 4:
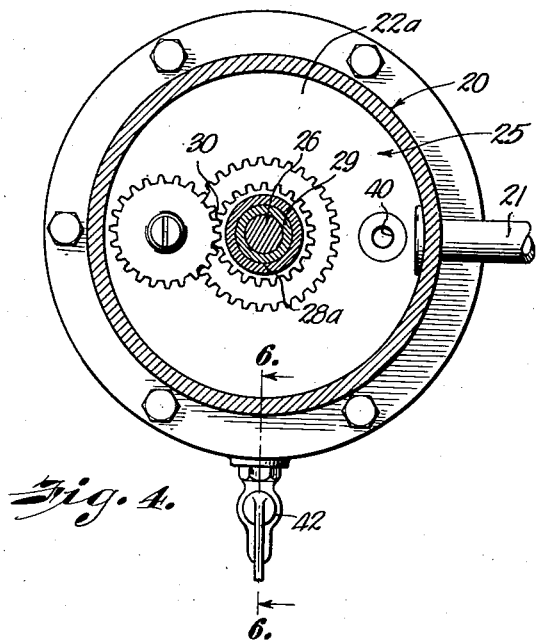

June 6, 1944.　　C. W. COCHRAN ET AL　　2,350,323
FLUID SAMPLING DEVICE
Filed Aug. 22, 1942　　2 Sheets-Sheet 1
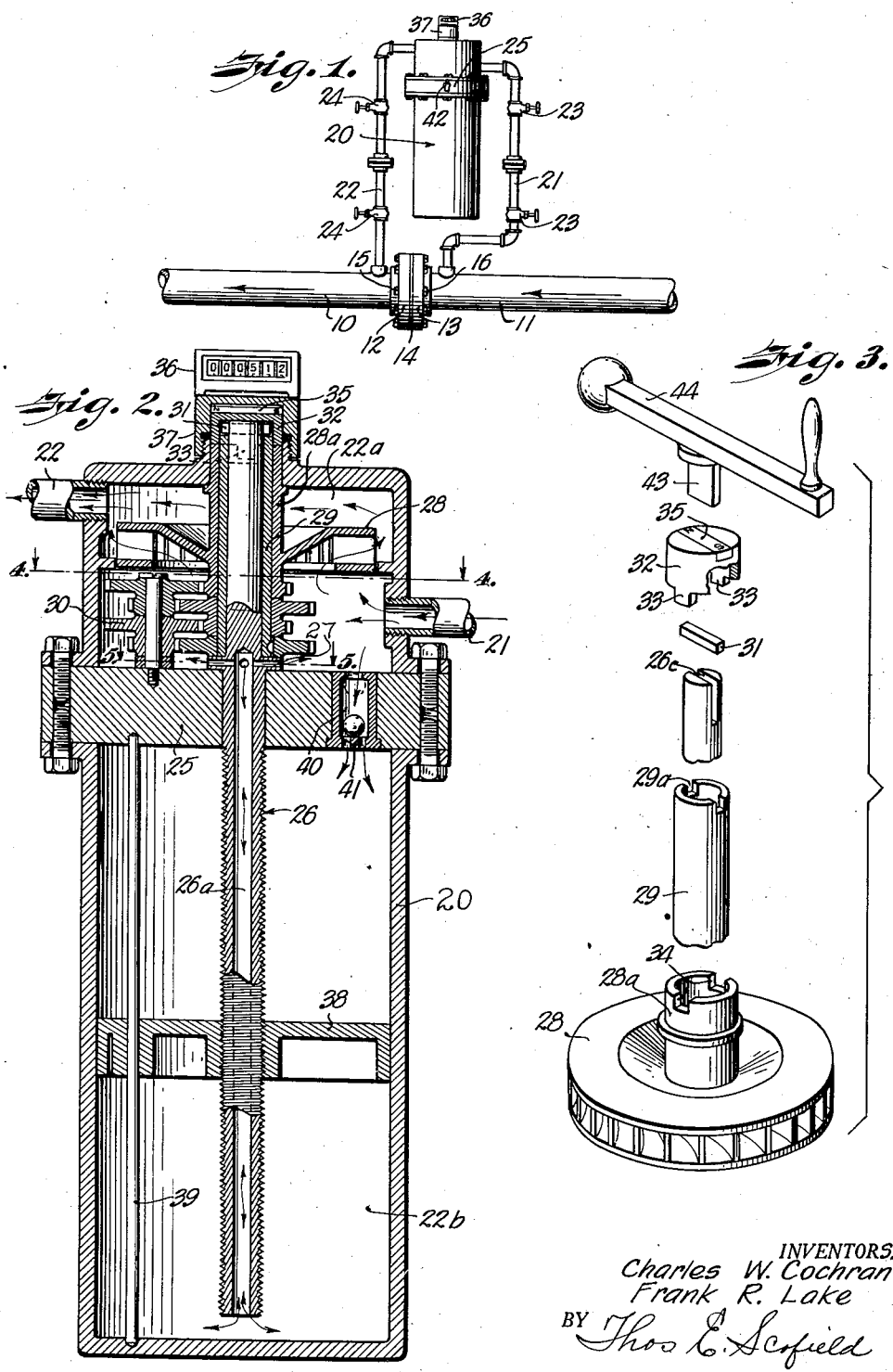
INVENTORS.
Charles W. Cochran
Frank R. Lake
BY Thos. E. Scofield
ATTORNEY.

June 6, 1944.  C. W. COCHRAN ET AL  2,350,323
FLUID SAMPLING DEVICE
Filed Aug. 22, 1942  2 Sheets-Sheet 2

INVENTORS.
Charles W. Cochran
Frank R. Lake
BY Thos. E. Scofield
ATTORNEY.

Patented June 6, 1944

2,350,323

UNITED STATES PATENT OFFICE 2,350,323

FLUID SAMPLING DEVICE

Charles W. Cochran, Houston, Tex., and Frank R. Lake, Ponca City, Okla., assignors to Continental Oil Company, Ponca City, Okla., a corporation of Delaware Application August 22, 1942, Serial No. 455,819

5 Claims. (Cl. 73—21)

The invention relates to improvements in fluid samplers of the type adapted to remove small quantities of fluid from a flow line transporting fluid under pressure.

Crude oil is piped to a storage tank after it is pumped from the ground. It is desirable to periodically test this oil in order to determine its quality and value. In the past, it has been the usual practice to take a sample of oil from the storage tank. However, the oil stratifies after it has been stored for a while, water and sediment in the oil collect in the bottom of the tank and temperatures which affect the gravity of oil vary at different locations and levels in the tank. These conditions make it difficult to obtain a representative sample. Obviously, the test sample should include all of the impurities contained in the oil when it is pumped from the ground. It has been the usual practice to take several samples from various locations and levels in the storage tank and mix them together. But this method seldom, if ever, yields a representative sample and, in addition, it is a slow and tedious task to withdraw the samples.

We now propose to obviate these difficulties by providing a fluid sampling device that can be attached to the pipe line through which the crude oil is transported. The oil in the pipe lines is thoroughly agitated and samples bled therefrom contain all of the constituents in their true proportions.

We are aware that mechanical fluid sampling devices have been used that have a valve which opens intermittently to permit fluid to flow from the pipe into a container. Since fluid samplers of this character remove small quantities of oil at spaced intervals, a truly representative sample is not obtained.

The fluid sampler hereinafter described bleeds a small stream of oil continuously from the pipe line until the sample container is filled. The flow of oil into the container is constant and in direct proportion to the flow of oil in the pipe line. Thus, a truly representative sample of the oil is obtained.

Our device may also be used to test fluids which are transported long distances through pipe or flow lines. It is necessary that considerable pressure be maintained in the flow line in order to obtain a relatively high rate of flow. Fluid sampling devices connected to the line bleed small quantities of fluid therefrom and these samples are subjected to suitable tests.

The high pressure maintained in the pipe line makes it difficult to bleed samples directly from the line without loss of fluid or pressure. It is essential that a device be provided that will bleed a sample of the fluid from the line without loss of either fluid or pressure in the line. The sampling devices are usually left unattended for substantial intervals of time and it is therefore desirable that the devices be uniquely constructed so that any fluid forced past the valves which control the flow of fluid to the devices will re-enter the flow line.

An important object of our invention is the provision of a fluid sampling device that may be easily attached to a pipe line, the device being uniquely constructed to return to the pipe line any fluid forced past the valves provided to control flow of fluid through the device.

Another object of our invention is the provision of a fluid sampler that may be easily operated regardless of the pressure in the flow line.

Still another object of our invention is the provision of a fluid sampler that is constructed so that a portion of the line fluid will flow therethrough and be utilized in the operation of the device.

Other objects and advantages of our invention will be apparent during the course of the following description.

Figure 5:
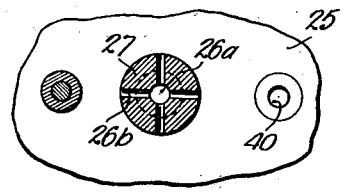
Figure 6:
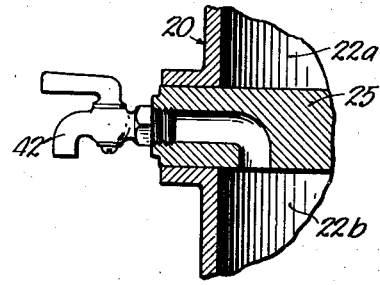
Figure 7:
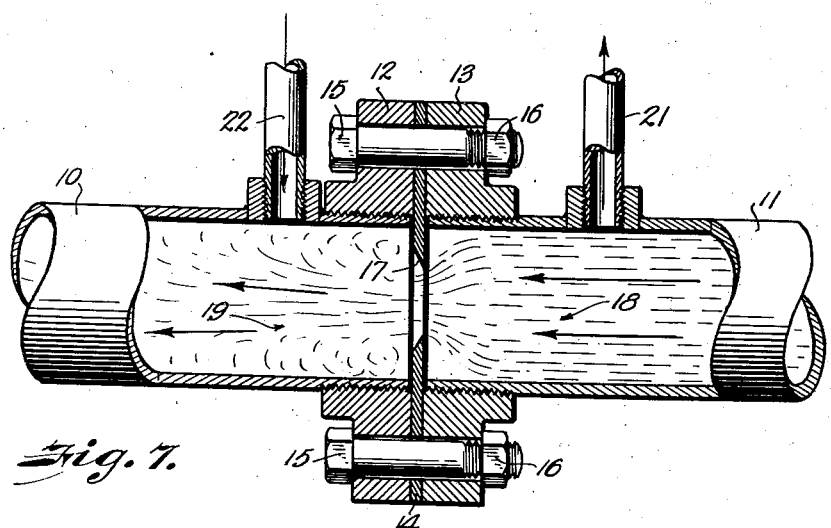

In the drawings forming a part of this specification and wherein like numerals are employed to designate like parts throughout the same, Fig. 1 is a side elevation showing a fluid sampler embodying our invention connected to a flow line, Fig. 2 is an enlarged longitudinal sectional view of the fluid sampler, Fig. 3 is an exploded perspective view, showing the turbine wheel, a transmission sleeve, a rotatable shaft, the key for connecting the shaft and transmission sleeve, a cap adapted to interlockingly engage with the upstanding sleeve of the turbine wheel and a crank for rotating the shaft, all comprising parts of the invention, Fig. 4 is a transverse sectional view taken on the line 4—4 of Fig. 2, Fig. 5 is a fragmentary transverse sectional view taken on the line 5—5 of Fig. 2, Fig. 6 is a fragmentary longitudinal sectional view, taken on the line 6—6 of Fig. 4, and Fig. 7 is a longitudinal sectional view of the portion of the flow line to which the fluid sampler is connected.

In the accompanying drawings wherein, for the purpose of illustration is shown a preferred embodiment of our invention, the numerals 10 and 11 designate pipe sections of a flow line. Threaded on the adjacent ends of the pipe sections are collars 12 and 13. An orifice plate 14 is interposed between the collars 12 and 13, and the plate and collars are clamped together by bolts and nuts 15 and 16. As best shown in Fig. 7, the orifice plate is provided with an opening 17 of smaller diameter than the pipe sections 10 and 11. Fluid in the pipe line flows in the direction of the arrows in Fig. 7 and the restricted dimensions of the orifice opening 17 increases the fluid pressure in chamber 18 and decreases the fluid pressure in section 19.

The fluid sampler connecting with the flow line at opposite sides of the orifice plate 14 includes a casing 20 connected to the high pressure section 18 by pipe 21 and to the low pressure section 19 by pipe 22. Flow of fluid through the pipes 21 and 22 is controlled by valves 23 and valves 24 respectively.

The casing 20 is separated into an upper compartment 22a and a lower compartment 22b by a transverse partition wall 25. As best shown in Fig. 2, pipes 21 and 22 communicate with the upper compartment 22a. Journaled centrally in the partition 25 is a rotatable shaft 26. The shaft is formed with an annular flange 27 which rests upon the top surface of the partition. Radial ducts 26b in the flange and an axial passage 26a in the lower end of the shaft permit fluid to flow between the compartment 26a and the portion of the compartment 26b below piston 38. The piston has a threaded connection with the shaft and is adapted to travel substantially the full length of compartment 26b. Guide rod 39 prevents the piston from rotating.

A turbine wheel 28 is mounted for rotation around a transmission sleeve 29 which surrounds the upper end of the shaft. It will be observed that pipe 21 enters the compartment adjacent its bottom and that pipe 22 enters the compartment adjacent its top. Fluid will therefore flow upwardly through the turbine wheel, as shown by the arrows in Fig. 2, to rotate the wheel. The turbine wheel is connected to the transmission shaft through reduction gearing 30 and the transmission sleeve is connected to shaft 26 by a key 31 which rests in slots 26c and 29a. An upstanding sleeve 28a formed on the turbine wheel surrounds the transmission sleeve 29 and has the upper end thereof fitted into an opening in the top of casing 20 to form a fluid tight connection therewith. The upper ends of shaft 26 and transmission sleeve 29 project slightly above the sleeve 28a so that key 31 will be readily accessible. The projecting ends of the shaft and transmission sleeve are enclosed by a cap 32. Lugs 33 formed on the cap 32 enter recesses 34 in sleeve 28a so that the cap will rotate with the turbine wheel. A magnet 35 embedded in the top surface of cap 32 coacts with a magnetic counter 36 to indicate the number of revolutions made by the turbine wheel. The parts projecting through the top of the casing are enclosed by a removable cap 37.

Fluid in the upper compartment 22a has access to the space above piston 38 through a passage 40 in partition 25. As best shown in Fig. 2, the passage 40 is controlled by a valve 41 which remains in the full line position when the piston 38 moves downwardly and moves to the dotted line position to close the passage when the piston moves upwardly. When piston 38 moves upwardly, fluid thereabove may be discharged from the casing through valve 42.

The operation of the device is as follows:

When valves 23 and 24 are open, the differential pressure in the flow line causes part of the fluid therein to by-pass through pipe 21, upper compartment 22a and pipe 22. When it is desired to remove a sample of fluid from the flow line, the piston is raised to a position adjacent the top of the lower compartment, counter 36 is set at "zero" and valves 23 and 24 are opened. Fluid traversing the upper chamber 22a rotates the turbine wheel which, in turn, rotates shaft 26 through the transmission sleeve 29. Rotation of the shaft by the turbine wheel will cause piston 38 to move downwardly. Fluid in the upper compartment normally has unrestricted access to the spaces above and below the piston so that these spaces are filled with fluid at line pressure. By reason of the fact that fluid both above and below the piston is at line pressure, there is no tendency for fluid to leak past the piston and, consequently, it is unnecessary to provide piston rings or packing around shaft 26. As piston 38 moves downwardly, fluid from the upper compartment enters the space above the piston through passage 40 and fluid below the piston enters the upper compartment 22a through passage 26a and ducts 26b.

When the counter 36 indicates that piston 38 has approached the lower end of its travel, the operator closes valves 23 and 24. Caps 37 and 32 are removed and key 31 is lifted from recesses 26c and 29a. The blade 43 of crank 44 is inserted into slot 26c. When crank 44 is rotated in a direction to cause piston 38 to rise in compartment 22b, valve 41 will close passage 40 and fluid above the piston will discharge from the casing through the open valve 42.

It may thus be seen that we have accomplished the objects of our invention. We have provided a fluid sampler that is hydraulically operated by fluid from the flow line to bleed a small quantity of fluid from the line. The construction of the sample is such that line pressure normally exists in all parts of the sampler, thereby eliminating the use of packing, piston rings and the like. The flow of fluid through the device is easily controlled and any fluid that may be forced past valves 23 and 24 will be returned to the line through pipe 22.

It is to be understood that the form of our invention herewith shown and described is to be taken as a preferred example of the same and that various changes in the size, shape and arrangement of parts may be resorted to without departing from the spirit of our invention or the scope of the appended claims.

Having thus described our invention, we claim:

1. A device for removing fluid from a flow line having a high pressure section and a low pressure section comprising a container having intercommunicating first and second compartments, means connecting the said first compartment to the high and low pressure sections of the flow line so that fluid in the line will flow therethrough, means for controlling the flow of fluid through the first compartment, a piston mounted for reciprocation in the second compartment, actuator means hydraulically operated by the flow of fluid through the first compartment having a driving connection with the said piston, and valve means for controlling communication between said first and second compartments, said valve means being automatically responsive to movement of the piston to admit fluid into the said second compartment.

2. A device for removing fluid from a flow line having a high pressure section and a low pressure section comprising a container having intercommunicating first and second compartments, means connecting the said first compartment to the high and low pressure sections of the flow line so that fluid in the line will flow therethrough, means for controlling the flow of fluid through the first compartment, a piston mounted for reciprocation in the second compartment, actuator means coactive with the piston, said actuator means being hydraulically operated by flow of fluid through the first compartment to lower the piston, a manually operable means for raising the piston, and valve means controlling communication between said first and second compartments, said valve means being automatically responsive to movement of the piston to admit fluid into the second compartment when the piston is lowered and to prevent fluid above the piston from reentering the upper compartment when the piston is raised.

3. A device for removing fluid from a flow line having a high pressure section and a low pressure section comprising a hollow container having intercommunicating first and second compartments, means connecting the said first compartment to the high and low pressure sections of the flow line so that fluid in the line will flow therethrough, means for controlling the flow of fluid through the first compartment, a piston in the second compartment, a shaft journaled for rotation in the second compartment having a threaded connection with the piston, means for passing fluid from the first compartment into the second compartment above and below the said piston, valve means for preventing fluid above the piston from flowing back into the first compartment, and an actuator means in the first compartment having a driving connection with the shaft, said actuator means being driven in a direction to lower the piston by the flow of fluid through the first compartment.

4. A device for removing fluid from a flow line having a high pressure section and a low pressure section comprising a hollow container having intercommunicating first and second compartments, means connecting the said first compartment to the high and low pressure sections of the flow line so that fluid in the line will flow therethrough, means for controlling the flow of fluid through the first compartment, a piston in the second compartment, a shaft journaled for rotation in the second compartment having a threaded connection with the piston, means for passing fluid from the first compartment into the second compartment above and below the said piston, valve means for preventing fluid above the piston from flowing back into the first compartment, an actuator means in the first compartment having a driving connection with the said shaft, said actuator means being driven in a direction to lower the piston by the flow of fluid through the first compartment, and means for draining the fluid above the piston from the second compartment.

5. A device for removing fluid from a flow line having a high pressure section and a low pressure section comprising a hollow container having intercommunicating first and second compartments, means connecting the said first compartment to the high and low pressure sections of the flow line so that fluid in the line will flow therethrough, means for controlling the flow of fluid through the first compartment, a piston in the second compartment, means for drawing the fluid above the piston from the second compartment, a shaft journaled for rotation in the second compartment having a threaded connection with the piston, means for passing fluid from the first compartment into the second compartment above and below the said piston, valve means for preventing fluid above the piston from flowing back into the first compartment, an actuator means in the first compartment having a driving connection with the said shaft, said actuator means being driven in a direction to lower the piston by the flow of fluid through the first compartment, and a manually operable means engageable with the shaft to rotate the same in a direction to raise the piston and discharge the fluid thereabove from the container.

CHARLES W. COCHRAN.
FRANK R. LAKE.